(12) United States Patent
Westgarth et al.

(10) Patent No.: US 11,506,314 B2
(45) Date of Patent: Nov. 22, 2022

(54) ARTICULATING FLOW LINE CONNECTOR

(71) Applicant: NATIONAL OILWELL VARCO UK LIMITED, Manchester (CA)

(72) Inventors: Richard Westgarth, Durham (GB); Jonathan Tweddle, Durham (GB)

(73) Assignee: NATIONAL OILWELL VARCO UK LIMITED, Manchester (CA)

( * ) Notice: Subject to any disclaimer, the term of this patent is extended or adjusted under 35 U.S.C. 154(b) by 129 days.

(21) Appl. No.: 16/214,930

(22) Filed: Dec. 10, 2018

(65) Prior Publication Data
US 2020/0182385 A1    Jun. 11, 2020

(51) Int. Cl.
*F16L 27/08* (2006.01)
*F16L 23/18* (2006.01)
*F16L 23/04* (2006.01)

(52) U.S. Cl.
CPC ............. *F16L 27/082* (2013.01); *F16L 23/04* (2013.01); *F16L 23/18* (2013.01)

(58) Field of Classification Search
CPC ... F16L 27/082; F16L 27/0861; F16L 27/023; F16L 27/0816; F16L 27/1012; F16L 23/04; F16L 23/08; F16L 23/16; F16L 23/18; F16L 23/20
USPC ........................................................ 285/281
See application file for complete search history.

(56) References Cited

U.S. PATENT DOCUMENTS

RE19,132 E * 4/1934 McGuirk ............ F16L 27/0832
285/181
2,862,731 A    12/1958 Hedden et al.
2,937,444 A    5/1960  Kern
3,458,219 A    7/1969  Wesch
3,572,380 A    3/1971  Jackson et al.
(Continued)

FOREIGN PATENT DOCUMENTS

CA      2605260 C     6/2011
CN      87100586      8/1987
(Continued)

OTHER PUBLICATIONS

"International Application Serial No. PCT/EP2019/084518, International Search Report dated Mar. 9, 2020", 5 pgs.
(Continued)

*Primary Examiner* — Zachary T Dragicevich
*Assistant Examiner* — James A Linford
(74) *Attorney, Agent, or Firm* — Schwegman Lundberg & Woessner, P.A.

(57) ABSTRACT

An articulating flow line connector for connecting two sections or portions of a flow line, which may be a pressurized flow line. The connector may be configured to provide a sealed connection between the two sections or portions of the flow line, and may provide for a rotating or swiveling connection between the two sections. The articulating flow line connector may generally have a seal carrier ring arranged between two flow lines hubs. Each flow line hub may connect to an end of a flow line section. The seal carrier ring may be configured to provide both a sealing surface and at least one bearing surface. The seal carrier ring may have a sealing flange, a bearing flange, and a web portion extending between the flanges. The connector may additionally have a clamp arranged around or over the seal carrier ring and a portion of the two hubs.

19 Claims, 11 Drawing Sheets

(56) References Cited

U.S. PATENT DOCUMENTS

| | | | |
|---|---|---|---|
| 3,752,507 A | | 8/1973 | Maurer et al. |
| 3,776,578 A | | 12/1973 | Jessup et al. |
| 4,354,698 A | | 10/1982 | Linder et al. |
| 4,391,297 A | | 7/1983 | Knight |
| 4,496,176 A | * | 1/1985 | Weinhold .............. F16L 17/073 285/365 |
| 4,844,133 A | | 7/1989 | Von Meyerinck et al. |
| 5,577,775 A | * | 11/1996 | Pearson ................ F16L 27/082 285/24 |
| 5,738,178 A | | 4/1998 | Williams et al. |
| 7,007,753 B2 | | 3/2006 | Robichaux et al. |
| 7,654,583 B2 | | 2/2010 | Kvamme et al. |
| 8,146,665 B2 | | 4/2012 | Neal |
| 8,590,556 B2 | | 11/2013 | Kendrick |
| 10,408,031 B2 | | 9/2019 | Oehring et al. |
| 2004/0094898 A1 | * | 5/2004 | Zheng .................... F16L 17/08 277/314 |
| 2009/0041588 A1 | | 2/2009 | Hunter et al. |
| 2010/0310384 A1 | | 12/2010 | Stephenson et al. |
| 2010/0320699 A1 | * | 12/2010 | Takeda .................. F16L 23/22 277/612 |
| 2012/0060929 A1 | | 3/2012 | Kendrick |
| 2012/0099954 A1 | | 4/2012 | Teichrob et al. |
| 2013/0284455 A1 | | 10/2013 | Kajaria et al. |
| 2014/0023463 A1 | | 1/2014 | Oren |
| 2014/0041317 A1 | | 2/2014 | Pham et al. |
| 2014/0048158 A1 | | 2/2014 | Baca et al. |
| 2014/0290768 A1 | | 10/2014 | Randle |
| 2015/0000766 A1 | | 1/2015 | Arizpe et al. |
| 2015/0336747 A1 | | 11/2015 | Teichrob et al. |
| 2016/0102537 A1 | | 4/2016 | Lopez |
| 2016/0160889 A1 | | 6/2016 | Hoffman et al. |
| 2016/0170403 A1 | | 6/2016 | Lopez et al. |
| 2017/0074074 A1 | | 3/2017 | Joseph et al. |
| 2017/0291780 A1 | | 10/2017 | Sherwood et al. |
| 2017/0334639 A1 | | 11/2017 | Hawkins et al. |
| 2018/0045331 A1 | | 2/2018 | Lopez et al. |
| 2018/0187507 A1 | | 7/2018 | Hill et al. |
| 2018/0223640 A1 | | 8/2018 | Keihany et al. |
| 2018/0283151 A1 | | 10/2018 | Cook et al. |
| 2018/0284817 A1 | | 10/2018 | Cook et al. |
| 2018/0298731 A1 | | 10/2018 | Bishop |
| 2019/0169971 A1 | | 6/2019 | Oehring et al. |
| 2020/0355321 A1 | | 11/2020 | Zerkus et al. |
| 2021/0040830 A1 | | 2/2021 | Mu et al. |
| 2021/0035491 A1 | | 11/2021 | Grimes et al. |
| 2021/0396223 A1 | | 12/2021 | Yeung et al. |

FOREIGN PATENT DOCUMENTS

| | | |
|---|---|---|
| CN | 103998833 | 8/2014 |
| CN | 108474505 | 8/2018 |
| CN | 109025944 A | 12/2018 |
| CN | 113167420 | 7/2021 |
| EP | 1872047 A2 | 1/2008 |
| GB | 1258305 A * | 12/1971 ............. F16L 23/04 |
| GB | 2341653 A | 3/2000 |
| WO | WO-2013095123 A1 | 6/2013 |
| WO | 2017039692 A1 | 3/2017 |
| WO | WO-2018074995 A1 | 4/2018 |
| WO | 2019112554 A1 | 6/2019 |
| WO | 2019147603 A1 | 8/2019 |
| WO | WO-2020056360 A1 | 3/2020 |
| WO | WO-2020120512 A1 | 6/2020 |
| WO | WO-2021003178 A1 | 1/2021 |
| WO | WO-2021003179 A1 | 1/2021 |

OTHER PUBLICATIONS

"International Application Serial No. PCT/EP2019/084518, Written Opinion dated Mar. 9, 2020", 7 pgs.

"International Application Serial No. PCT/US2019/051158, International Search Report dated Jan. 6, 2020", 4 pgs.

"International Application Serial No. PCT/US2019/051158, Invitation to Pay Additional Fees dated Oct. 28, 2019", 2 pgs.

"International Application Serial No. PCT/US2019/051158, Response filed Jul. 13, 2020 to Written Opinion dated Jan. 6, 2020", 3 pgs.

"International Application Serial No. PCT/US2019/051158, Written Opinion dated Jan. 6, 2020", 8 pgs.

"International Application Serial No. PCT/US2019/051158, International Preliminary Report on Patentability dated Sep. 30, 2020", 4 pgs.

"International Application Serial No. PCT/US2020/040336, International Search Report dated Sep. 25, 2020", 3 pgs.

"International Application Serial No. PCT/US2020/040336, Written Opinion dated Sep. 25, 2020", 6 pgs.

"International Application Serial No. PCT/US2020/040338, International Search Report dated Sep. 25, 2020", 3 pgs.

"international Application Serial No. PCT/US2020/040338, Written Opinion dated Sep. 25, 2020", 6 pgs.

"International Application Serial No. PCT/US2021/073083, International Search Report dated Feb. 28, 2022", 6 pgs.

"International Application Serial No. PCT/US2021/073083, Written Opinion dated Feb. 28, 2022", 6 pgs.

"U.S. Appl. No. 17/247,769, Non Final Office Action dated Jan. 25, 2022", 10 pgs.

"International Application Serial No. PCT/US2020/040336, International Preliminary Report on Patentability dated Jan. 13, 2022", 8 pgs.

"Saudi Arabia Application No. 521422202, Office Action dated Jun. 30, 2022", w o English translation, 6 pgs.

"Chinese Application Serial No. 201980080622.0, Office Action dated Aug. 9, 2022", w English translation, 16 pgs.

"U.S. Appl. No. 17/247,769, Examiner Interview Summary dated Apr. 22, 2022".

"U.S. Appl. No. 17/247,769, Response filed Apr. 25, 2022 to Non Final Office Action dated Jan. 25, 2022".

* cited by examiner

ARTICULATING FLOW LINE CONNECTOR

FIELD OF THE INVENTION

The present disclosure relates to flow lines for transporting drilling fluids and/or other fluids. Particularly, the present disclosure relates to flow lines for transporting pressurized drilling fluids and/or other pressurized fluids. More particularly, the present disclosure relates to articulating joints for pressurized fluid flow lines.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Flow lines are often used to transport fluid, and in some cases pressurized fluid, at well and drilling locations. For example, fracking operations are frequently conducted using high pressure fluids directed through flow lines. Such high pressure fluids can place added stress on joints and connections between sections of flow line. This can lead to fluid leakage and reduced pressure in the lines.

Additionally, it is often desirable to maneuver flow lines at a well site. For example, where multiple wells are arranged in relatively close proximity to one another, flow lines may be manipulated to deliver fluid to the various well heads. In this way, flow lines are sometimes provided with movable joints to allow two sections of flow line to rotate and/or articulate with respect to one another.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to an articulating flow line connector for connecting two flow line sections. The connector may include a pair of flow line hubs, each hub configured for coupling to an end of a flow line section. The connector may additionally include a seal carrier ring arranged between the flow line hubs and having, for each hub, a sealing surface and a bearing surface. The connector may additionally have a clamp arranged over the seal carrier ring. Each of the two hubs may be rotatable about a longitudinal axis. In some embodiments, the seal carrier ring may include a bearing flange providing the bearing surfaces, a sealing flange providing the sealing surfaces, and a web portion extending between the bearing flange and the sealing flange. The web portion may provide a second bearing surface for each hub in some embodiments. Additionally, the connector may have a pair of seal rings arranged on the sealing flange, with a seal ring arranged on each side of the web portion. The bearing flange may be arranged between an outer wall of each hub and an inner wall of the clamp. The sealing flange may be arranged between an inner wall of each hub and a cavity defined by the inner walls. In some embodiments, for each hub, a tolerance between the inner wall of the hub and the sealing flange may be larger than a tolerance between the outer wall of the hub and the clamp. Each hub may have an outer wall defining an outer shoulder, and the clamp may be arranged around the outer shoulders of the hub. In some embodiments, the seal carrier ring may be composed of tungsten carbide.

The present disclosure, in one or more embodiments, additionally relates to an articulating flow line connector for connecting two flow line sections. The flow line connector may include a seal carrier ring configured for arranging between two flow line hubs, the seal carrier ring having, for each hub, a sealing surface and a bearing surface. The connector may additionally have a clamp arranged over the seal carrier ring. In some embodiments, the carrier ring may have a bearing flange providing the bearing surfaces, a sealing flange providing the sealing surfaces, and a web portion extending between the bearing flange and the sealing flange. Moreover, the web portion may provide a second bearing surface for each of the two hubs. In some embodiments, the connector may include a pair of seal rings arranged on the sealing flange, with one sealing ring arranged on each side of the web portion. The seal carrier ring may additionally have at least one bleed hole for each of the two hubs. The clamp may have two separable portions in some embodiments, and at least one seal may be arranged between the two separable portions. The seal carrier ring may be composed of tungsten carbide in some embodiments.

The present disclosure, in one or more embodiments, additionally relates to a seal carrier ring for an articulating flow line connector. The seal carrier ring may have a bearing flange providing a pair of first bearing surfaces, a sealing flange providing a pair of sealing surfaces, and a web portion extending between the bearing flange and sealing flange. The web portion may provide a pair of second bearing surfaces. In some embodiments, a pair of seal rings may be arranged on the sealing flange, with a seal ring arranged on each side of the web portion. Moreover, in some embodiments, the seal carrier ring may have at least one bleed hole for each hub.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to an articulating flow line connector for connecting two sections or portions of a flow line. The connector may be configured to provide a sealed connection between the two sections or portions of the flow line. Additionally, the connector may be configured to provide for a rotating or swiveling connection between the two sections, such that one or both sections of the flow line may rotate or swivel in relation to the other of the two sections. Where elbows or other joints are provided, long sections of pipe may fold or open about those joints allowing for the system to reach wellheads at various distances and locations. In some embodiments, the flow line may be a pressurized line, and the connector may thus be configured to withstand radial forces from pressurized fluid within the line, and may be configured to maintain a sealed connection despite such forces. The articulating flow line connector may generally have a seal carrier ring arranged between two flow lines hubs. Each flow line hub may connect to an end of a flow line section. The seal carrier ring may be configured to provide both a sealing surface and at least one bearing surface. The connector may additionally have a clamp arranged around or over the seal carrier ring and a portion of the two hubs.

Figure 1:
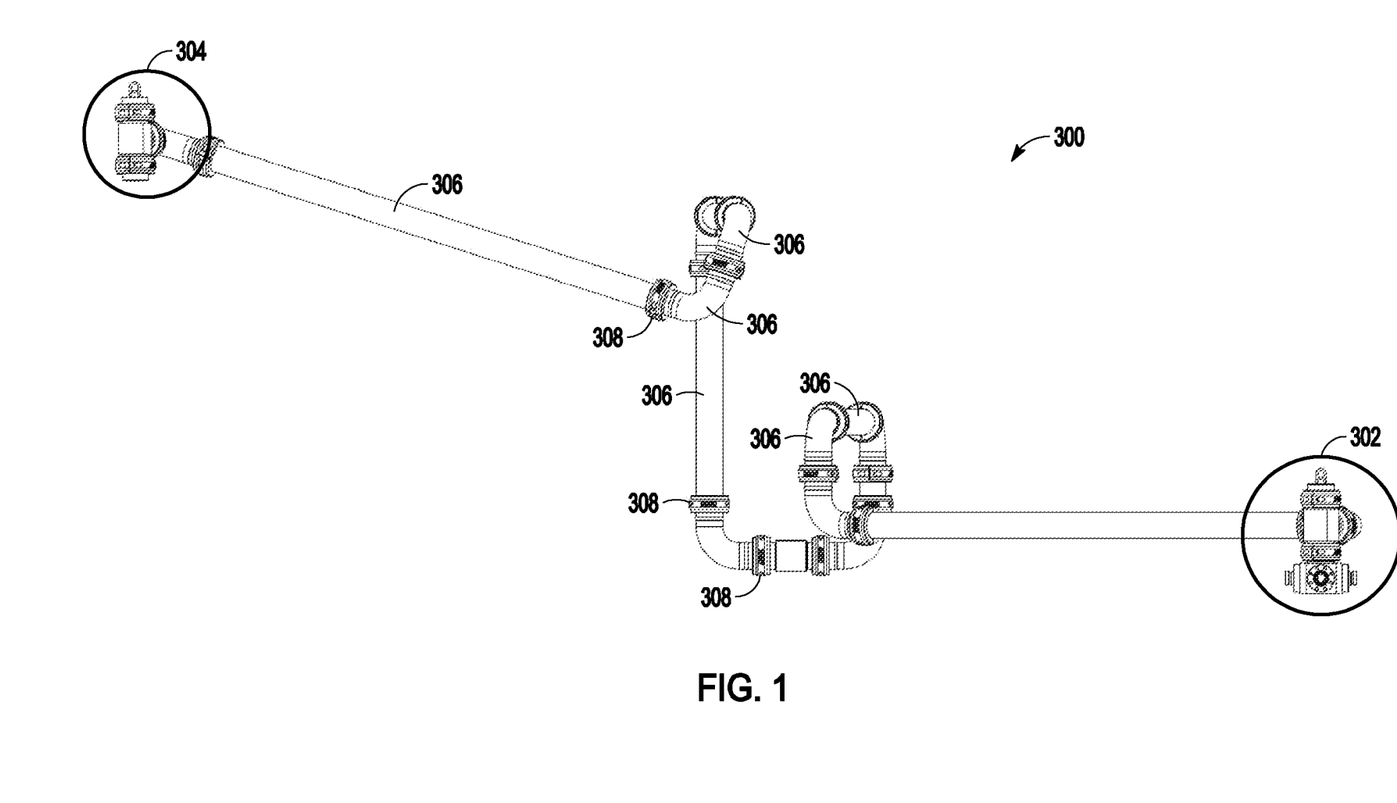
FIG. 1 is a diagram of a flow line of the present disclosure, according to one or more embodiments.

FIG. 1 shows one embodiment of a flow line 300 of the present disclosure extending between an origin point 302 and a destination point 304. The origin point 302 may be a point or location from which fluid is transported to reach the destination head 304. For example, the origin point may be or include a pump for pumping hydraulic fracturing fluid through the flow line 300, and the destination point 304 may include a well head. The flow line 300 may be configured for transporting fluid between the origin point 302 to the destination head 304. The flow line 300 may have a plurality of pipe sections 306 arranged to form a continuous flow path. The flow path may be configured to provide a length, spacing, and/or clearances around the flow line 300 as desired. A plurality of connectors 308 may couple the pipe sections 306 together to form the flow path. One or more of the connectors 308, and in some embodiments all of the connectors, may be or include an articulating flow line connector of the present disclosure. Where a connector 308 is an articulating connector of the present disclosure, one or both pipe sections 306 joined by that connector may be configured to rotate or articulate about the connection.

Figure 2:
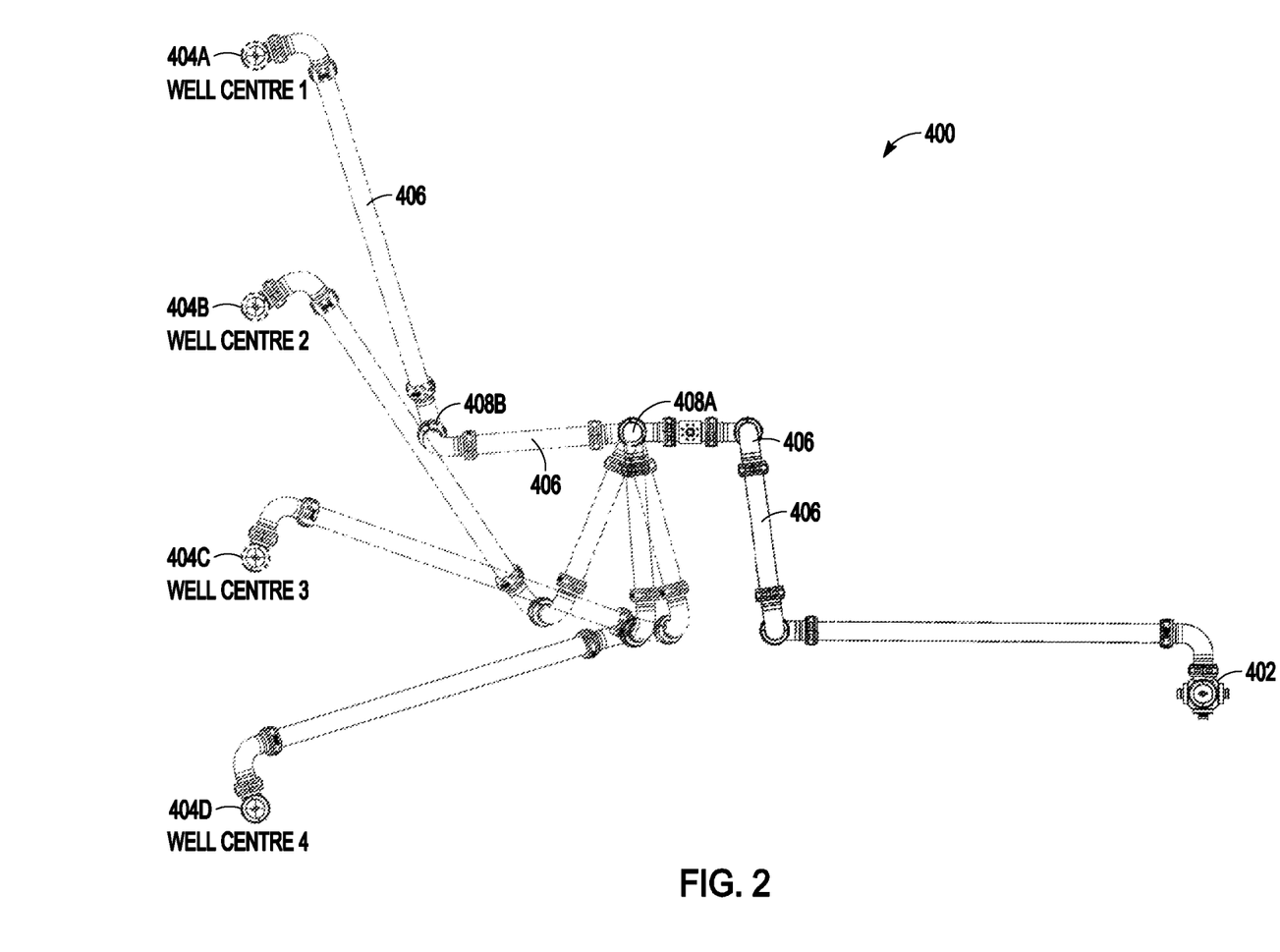
FIG. 2 is a diagram of another flow line of the present disclosure, according to one or more embodiments.
Figure 3:
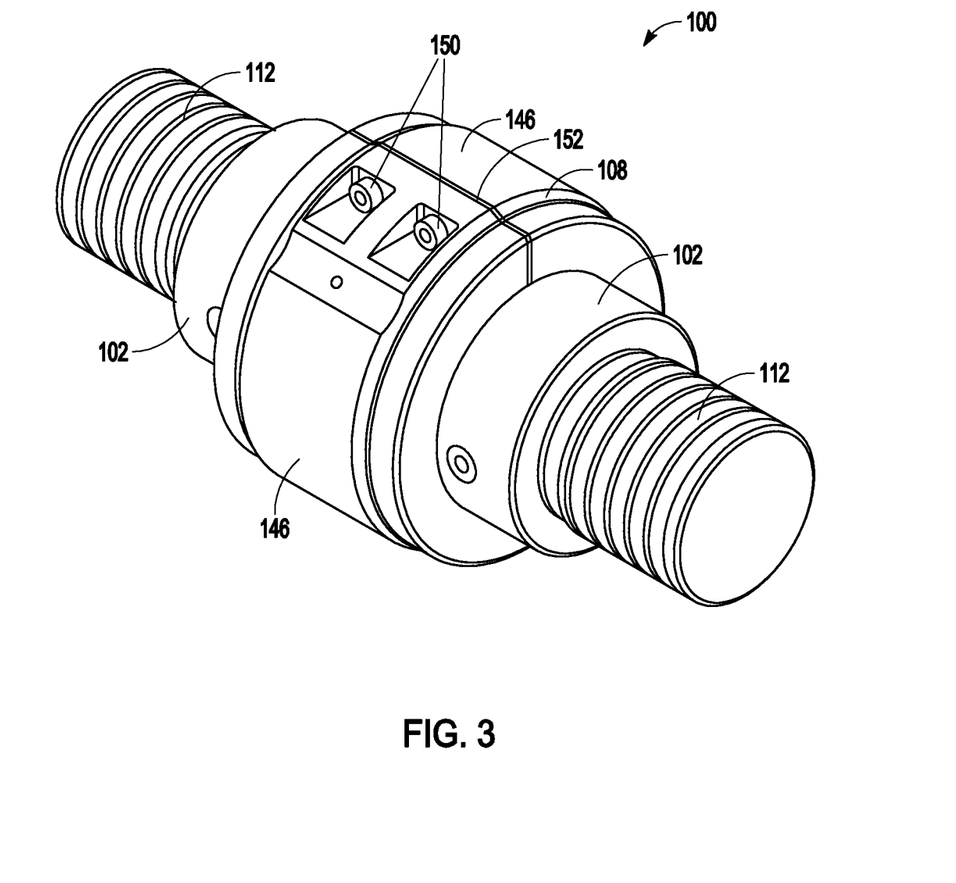
FIG. 3 is a perspective view of an articulating flow line connector of the present disclosure, according to one or more embodiments.
Figure 4:
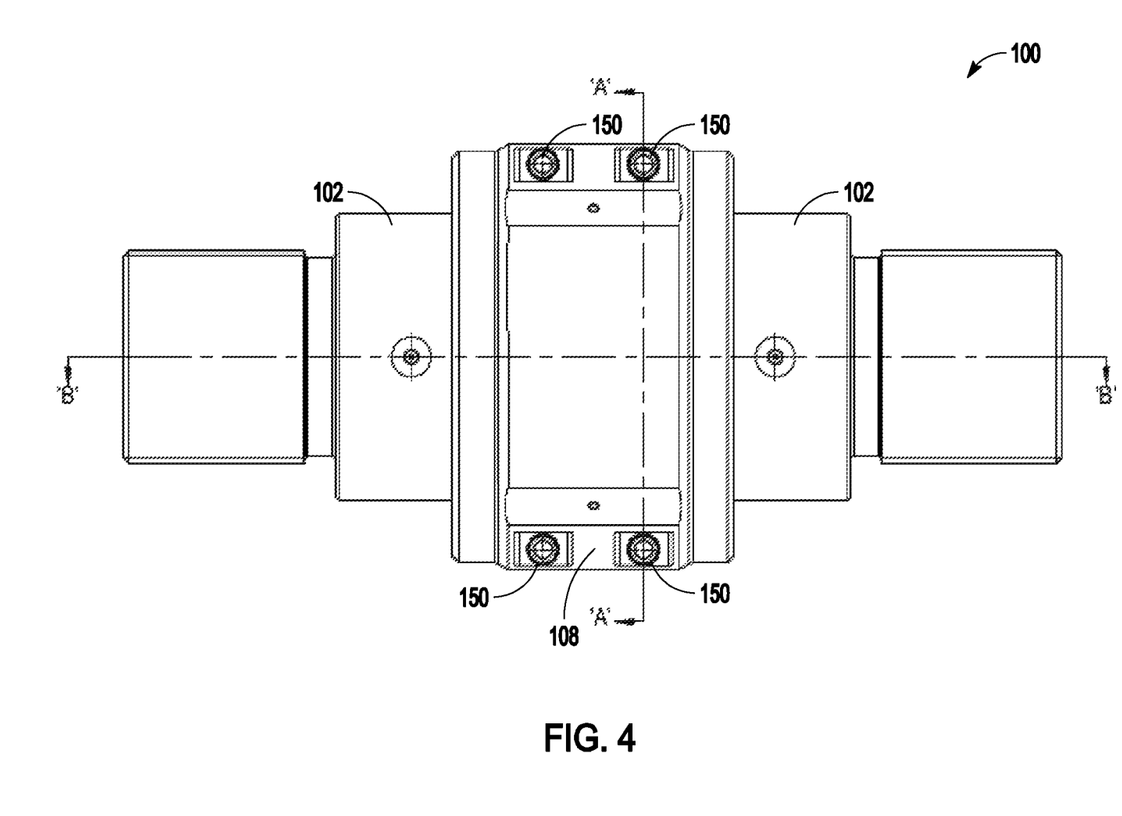
FIG. 4 is a side view of the articulating flow line connector of FIG. 3, according to one or more embodiments.

FIG. 2 shows another embodiment of a flow line 400 of the present disclosure. As shown, the flow line 400 may be configured to extend between an origin point 402, such as a hydraulic fracturing pump, and a plurality of well heads 404. The flow line 400 may have a plurality of pipe sections 406 coupled together in a continuous flow path by a plurality of connectors 408. At least one connector 404a, and in some cases at least two connectors 404a, 404b, may be articulating flow line connectors of the present disclosure. The articulating flow line connectors 404a, 404b may allow pipe sections 406 of the flow line 400 to be pivoted or articulated as needed or desired to reach each of the plurality of well heads 404.

Turning now to FIGS. 2-8, an articulating flow line connector 100 of the present disclosure is shown, according to one or more embodiments. The connector 100 may be configured to join two flow line sections or portions. The connector 100 may be configured to provide a sealed connection between the two flow line sections such that fluid, and in some embodiments pressurized fluid, may be directed across the connection between the two sections without leakage or pressure loss. Additionally, the connector 100 may be configured to provide an articulable joint between the two sections. As shown, the connector 100 may generally have a pair of crossovers or hubs 102, a seal carrier ring 104, at least one seal ring 106, and a clamp 108.

Figure 5:
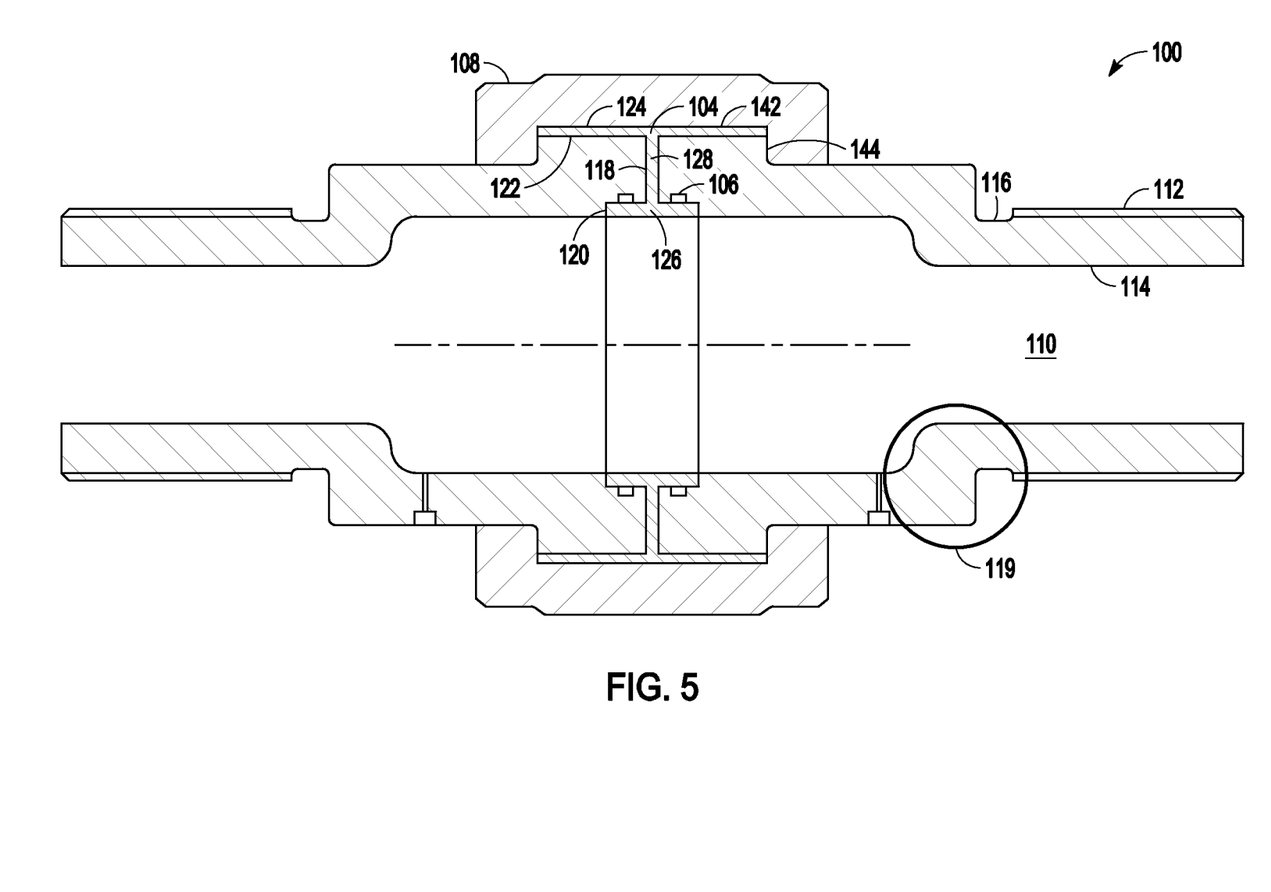
FIG. 5 is a cross-sectional view of the articulating flow line connector of FIG. 3 along line B-B, according to one or more embodiments.

Each hub 102 may be configured to be arranged at an end of a flow line section. Each hub 102 may have a cavity 110 arranged therein for directing fluid therethrough. The hubs 102 may each have outer or inner threading 112 configured to engage threading of a connected flow line section or fitting. In other embodiments, the hubs 102 may each have other suitable coupling mechanisms for coupling to flow line sections. In some embodiments, each hub 102 may be or include a straight joint, tee-joint, elbow joint, wye joint, cross joint, lateral joint, or any other suitable fitting type.

With particular reference to FIG. 5, in some embodiments, each hub 102 may have an inner wall 114 having an inner diameter and an outer wall 116 having an outer diameter. The inner wall 114 may define the cavity 110 arranged within the hub 102. The inner wall 114 and outer wall 116 may meet at mouth 118 extending between the inner and outer walls. The mouth 118 may define an opening to the cavity 110. In some embodiments, the inner wall 114 of each hub 102 may define an inner notch 120. The inner notch 120 may be sized and shaped to receive a sealing flange 126 of the seal carrier ring 104, as described below. In particular, in some embodiments, the inner notch 120 may have a depth configured to receive the sealing flange 126 with additional space arranged between the sealing flange and the wall of the inner notch 120, so as to avoid contacting the sealing flange. The inner notch 120 may define a larger inner cavity diameter than that defined by adjacent portions of the inner wall 114. In some embodiments, the inner notch 120 may have a largest inner diameter of the hub 102.

In some embodiments, the outer wall 116 of each hub 102 may have an outer shoulder 122. The outer shoulder 122 may be sized and shaped so as to be arranged within the clamp 108. In some embodiments, the outer shoulder 122 may have a larger diameter than adjacent portions of the outer wall 116. In some embodiments, the outer shoulder 122 may have a largest diameter of the hub 102. In some embodiments, the outer shoulder 122 may be a squared shoulder. That is, the outer wall 116 of the hub 102 may extend outward at 90 degrees or approximately 90 degrees to define a diameter of the outer shoulder. However, in other embodiments, the outer shoulder 122 of each hub 102 may be a tapered shoulder, such that the outer diameter 116 may extend outward at a different angle, such as approximately a 45-degree angle, to define the outer shoulder. In still other embodiments, the shoulders 122, inner notches 120, mouths 118, and/or other portions of the hubs 102 may have other suitable geometries or configurations.

In some embodiments, the hub 102 may have a jog 119 arranged adjacent a threaded portion of the hub, or otherwise arranged near a portion of the hub configured to connect to flow line section or fitting. In particular, in some embodiments, the outer wall 116 and/or inner wall 114 may have a reduced diameter where the threading 112 is arranged. For example, a connecting portion of the outer wall 116 may have a first diameter and may additionally be configured with the outer threading 112. Beyond the threading, the outer wall 116 may extend outward at an angle of 90 degrees or approximately 90 degrees to a second diameter, which may be larger than the first diameter. In other embodiments, the outer wall 116 may extend at a different angle between the first and second diameters. For example, a slope of approximately 45 degrees may be arranged between the first and second diameters of the outer wall 116. Similarly, the inner wall 114 of the hub 102 may have a first diameter arranged adjacent or generally aligned with the first diameter of the outer wall 116. The inner wall 114 may extend outward at an angle of 90 degrees or approximately 90 degrees to a second diameter, which may be larger than the first diameter, and which may generally align with the second diameter of the outer wall 116. In other embodiments, the inner wall 114 may extend at a different angle between the first and second diameters. In this way, the jog 119 or neck may be arranged adjacent the threaded, or otherwise connecting, portion of the hub 102.

Figure 9:
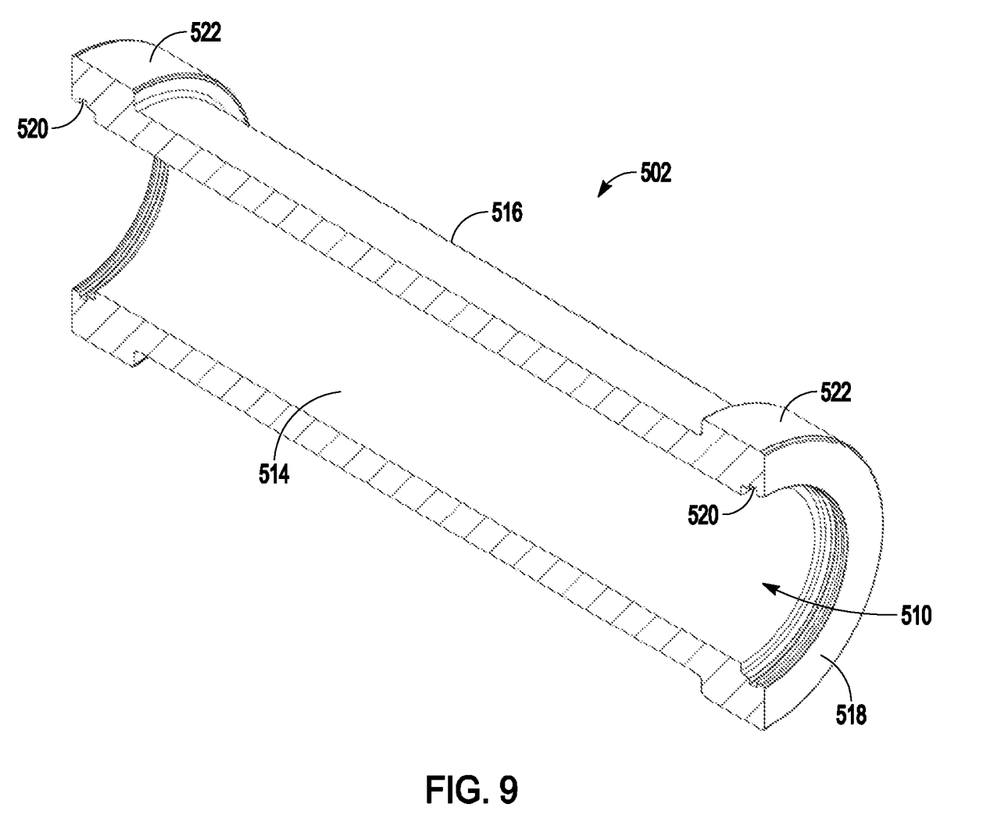
FIG. 9 is a cross-sectional view of a flow line section, according to one or more embodiments.

It is to be appreciated that in other embodiments, a hub or flow line section may have a different cross-sectional shape. For example, FIG. 9 shows one embodiment of a spool-shaped pipe section 502 that may be coupled to a flow line connector of the present disclosure. As shown, the pipe section 502 may have a cavity 510 arranged therein for directing fluid therethrough. The section 502 may further have a an inner wall 514 having an inner diameter and an outer wall 516 having an outer diameter. The inner wall 514 may define the cavity 510. At each end of the pipe section 502, the inner 514 and outer 516 walls may meet at a mouth 518, which may in turn define an opening to the cavity 510. Similar to the hub 102 described above, the inner wall 514 may define an inner notch 520 near each mouth 518, the cavity shaped and configured to receive the sealing flange of and one or more seal rings of an articulating flow line connector of the present disclosure. Further, the outer wall 516 may have an outer shoulder 522 arranged near each mouth 518. The outer shoulder 522 may be sized and shaped so as to be arranged within a clamp of an articulating flow line connector of the present disclosure. The outer shoulder 522 may be similar to the shoulder 122 described above with respect to hub 102.

With reference back to FIG. 5, the seal carrier ring 104 may be arranged between the two hubs 102. In particular, the seal carrier ring 104 may be configured to be arranged between the two mouths 118 of the hubs 102. The seal carrier ring 104 may position the one or more seals 106 generally between the two hubs. Additionally, however, the seal carrier ring 104 may provide a bearing surface to facilitate rotation or swiveling of one or both hubs 102. That is, the seal carrier ring 104 may provide a sealed connection between the two hubs 102 while still allowing one or both hubs to rotate or swivel along a longitudinal axis of the hub. The seal carrier ring 104 may be a circular structure configured to be arranged between the mouths 118 of the two hubs 102. In some embodiments, the seal carrier ring 104 may have a generally I-shaped cross-sectional shape with two flanges and a web. In particular, the seal carrier ring 104 may have an bearing flange 124, a sealing flange 126, and a web portion 128 extending between the bearing flange and sealing flanges. However, in other embodiments, the seal carrier ring 104 may have any other suitable cross-sectional shape.

Figure 6:
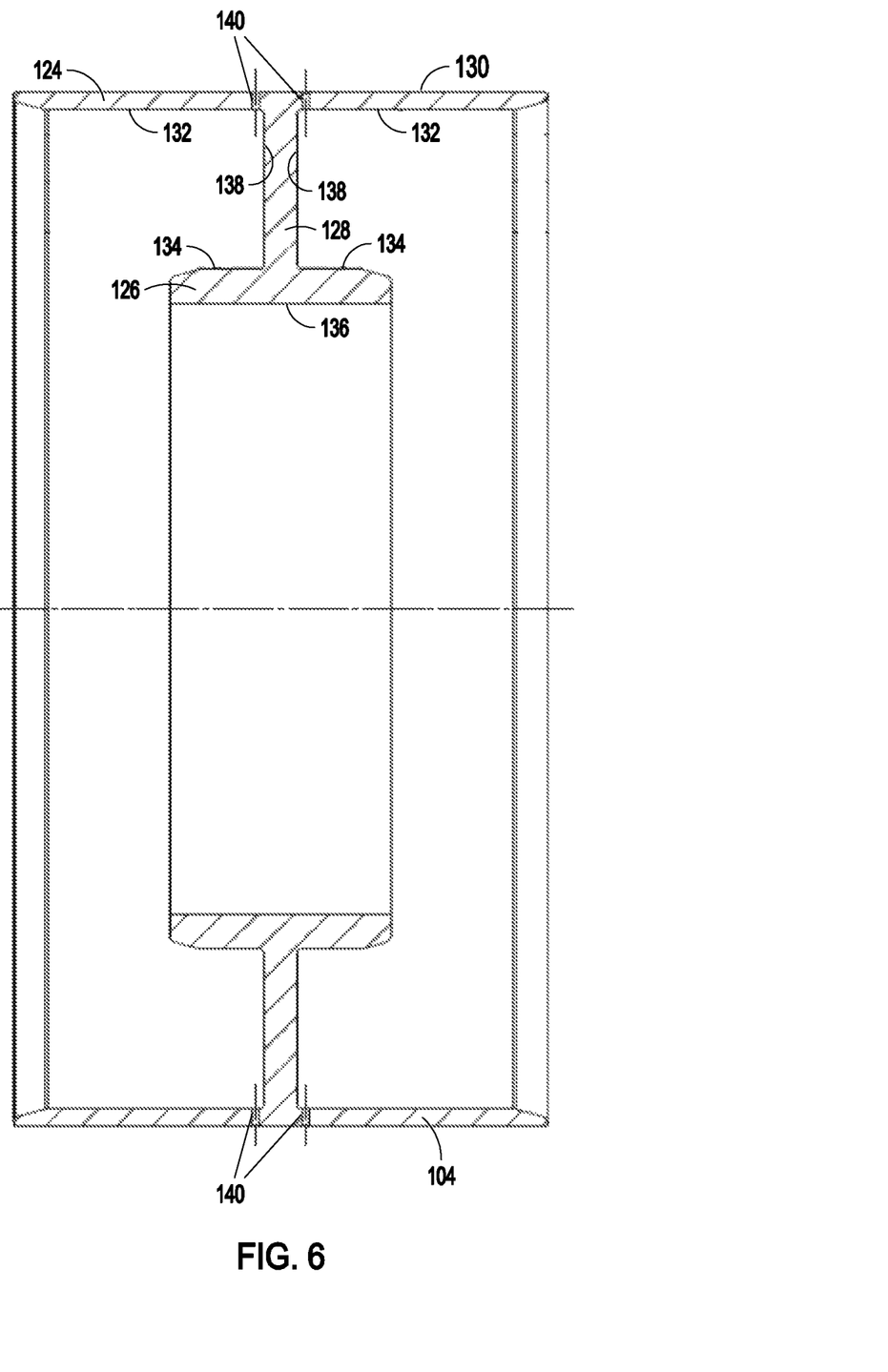
FIG. 6 is a cross-sectional view of a seal carrier and a portion of two hubs of the present disclosure, according to one or more embodiments.

The bearing flange 124 may be configured to provide a bearing surface, which may be a relatively low friction bearing surface against which one or both hubs 102 may rotate. In some embodiments, the bearing flange 124 may provide more than one bearing surface for one or both hubs 102. With particular reference to FIG. 6, the bearing flange 124 may have a thickness defined between an outer wall 130 and an inner wall 132. The bearing flange 124 may be configured to be arranged with its thickness extending between an outer wall 116 of each hub 102 and the clamp 108. In particular, the outer wall 130 of the bearing flange 124 may be configured for positioning generally beneath the clamp 108, and the inner wall 132 of the bearing flange may be configured for positioning over an outer wall 116 of each of the two hubs 102. The bearing flange 124 may have a thickness between the outer wall 130 and inner wall 132 of less than 1 inch, less than 0.5 inches, or less than 0.25 inches. In some embodiments, the bearing flange 124 may have a thickness of between approximately 0.2 inches and approximately 0.4 inches. In other embodiments, the bearing flange 124 may have any other suitable thickness. The bearing flange 124 may have a width perpendicular to the thickness and extending between opposing ends of the flange. In particular, the bearing flange 124 may have a width of between approximately 3 inches and approximately 16 inches, or between approximately 4 inches and approximately 12 inches, or between approximately 6 inches and approximately 8 inches. In other embodiments, the bearing flange 124 may have any other suitable width. The width of the bearing flange 124 may be sized so as to extend across at least a portion of the mouth 118 of each hub 102 and further may be configured so as to be arranged beneath the clamp 108. For example, in some embodiments, the width of the bearing flange 124 may be configured to extend across each outer shoulder 122 of the hubs 102 when the hubs 102 are arranged to abut the seal carrier ring 104. In some embodiments, the bearing flange 124 may be a tapered flange and may be tapered on one or both ends. The bearing flange 124 may have an inner diameter defined by the inner wall 132 of the flange and configured to accommodate outer diameters of the hubs 102. In some embodiments, the bearing flange 124 may be sized and configured to fit snuggly or tightly over the hubs 102.

The sealing flange 126 may be configured to position the one or more seals 106 generally between the two hubs 102. With continued reference to FIG. 4, the sealing flange 126 may have a thickness defined between an outer wall 134 and an inner wall 136. Additionally, the sealing flange 126 may have a width perpendicular to the thickness and extending between opposing ends of the flange. In general, the thickness and width of the sealing flange 126 may be configured to be arranged within the inner notches 120 of the two hubs 102. In some embodiments, the sealing flange 126 may have a thickness of less than 2 inches, less than 1 inch, or less than 0.75 inches. In some embodiments, the sealing flange 126 may have a thickness of between approximately 0.4 inches and approximately 0.6 inches. In other embodiments, the sealing flange 126 may have any other suitable thickness. The sealing flange 126 may have a width of between approximately 0.5 inches and approximately 8 inches, or between approximately 1 inch and approximately 4 inches, or between approximately 2 inches and approximately 4 inches. In other embodiments, the sealing flange 126 may have any other suitable width. The sealing flange 126 may have an inner diameter defined by the inner wall 136. In some embodiments, the inner diameter may be the same, or approximately the same, as an inner diameter of the hubs 102. It is to be appreciated that the sealing flange 126 may be sized and shaped to be arranged within the inner notches 120, so as to create a continuous inner wall between the two hubs 102. In some embodiments, the sealing flange 126 may have a larger thickness than the bearing flange 124. Additionally, the sealing flange 126 may have a smaller width than the bearing flange 124. However, in other embodiments, the sealing 126 and bearing 124 flanges may be sized and shaped differently with respect to one another.

Figure 8:
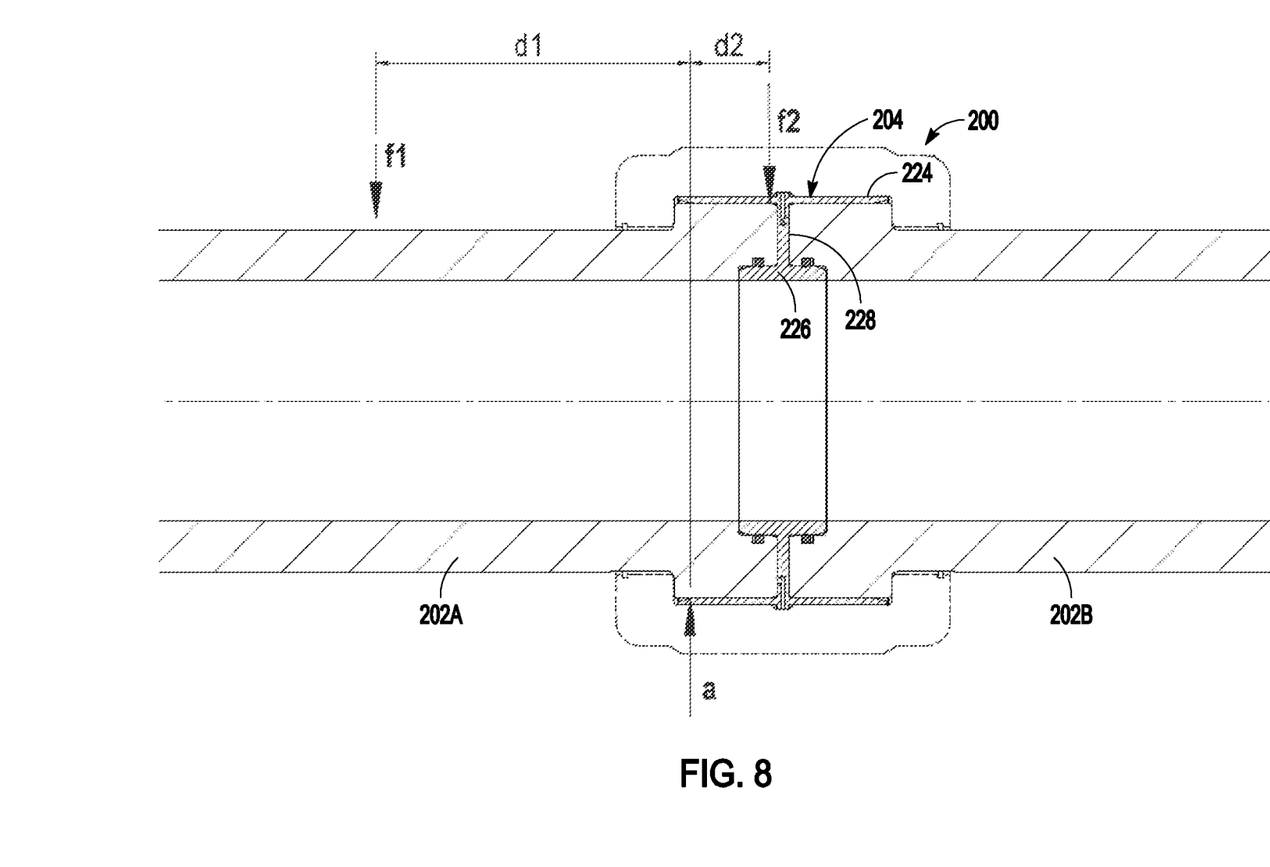
FIG. 8 is a cross-sectional view of another articulating flow line connector and a portion of two hubs of the present disclosure, according to one or more embodiments.

It is to be appreciated that a relatively wider width of the bearing flange 124 may help to balance bending moments at the connection between the hubs while reducing an amount of torque needed to rotate a hub 102. For example, FIG. 8 shows two hubs 202 connected by a connector 200 having a seal carrier ring 204 of the present disclosure. The seal carrier may have a bearing flange 224, a sealing flange 226, and a web 228. Assuming for the moment that the hub 202b on the right is fixed, the hub 202a on the left may have a force f1 due to its weight, and may thus have a tendency to pivot about point a. A force f2, provided by the connector 200, may counteract the moment about point a due to force f1. However, a relatively larger f2 force may increase the torque needed to rotate the hub 202a about the connection to the opposing hub 202b. It is thus to be appreciated that increased width of the bearing flange 224 may help to increase the moment arm d2 between the force f2 and point and thus to decrease force f2. For this reason, the bearing flange 224 may have a wider width than the sealing flange 226 in some embodiments. In some embodiments, the bearing flange 224 may have a width extending across the outer shoulders of the hubs, as described above.

The web portion 128 may extend between the bearing 124 and sealing 126 flanges, and may provide an additional bearing surface for one or both of the hubs. The web portion 128 may have parallel sidewalls 138 defining a thickness. In some embodiments, the web portion 128 may have a thickness of less than 2 inches, less than 1 inch, or less than 0.5 inches. In some embodiments, the web portion 128 may have a thickness of between approximately 0.2 inches and approximately 0.6 inches. In other embodiments, the web portion 128 may have any other suitable thickness. The thickness of the web portion 128 may generally be configured to withstand radial and/or axial pressures applied to the seal carrier from pressurized fluid within the flow line. Each sidewall 138 of the web portion 128 may be configured to abut the mouth 118 of a hub 102. The web portion 128 may have a width extending between the bearing flange 124 and the sealing flange 126. The width of the web portion 128 may be sized to receive the mouths 118 of the hubs 102, such that the two hubs may be arranged with the mouths abutting the sidewalls 138 of the web portion. In particular, the web portion 128 may have a width of between approximately 2 inches and approximately 10 inches, or between approximately 3 inches and approximately 7.5 inches, or between approximately 4 inches and approximately 5 inches. In other embodiments, the web portion 128 may have any other suitable width.

With continued reference to FIG. 6, in some embodiments, the seal carrier ring 104 may have one or more bleed openings or holes 140. For example, bleed holes 140 may be arranged along the bearing flange 124. In some embodiments, four bleed holes 140 may be arranged on the bearing flange 124, with two pairs of bleed holes evenly spaced along the flange. As shown in FIG. 6, for each pair of bleed holes 140, one hole may be placed one each side of the web portion 128. In other embodiments, the bearing flange 124 may have any other suitable number of bleed holes 140 or pairs of bleeds holes. In still other embodiments, bleed holes 140 may be arranged along the web portion 128 or at a different location on the seal carrier ring 104. The bleed holes 140 may facilitate assembly of the connector 100. In particular, bleed holes 140 may help mitigate hydraulic lock as the seal carrier ring 104 is fitted over each of the hubs 102.

The seal carrier ring 104 may be constructed of one or more metals or other materials configured to provide a relatively low friction bearing surface. For example, in some embodiments, the seal carrier ring 104 may be constructed of tungsten carbide. In other embodiments, the seal carrier ring 104 may be constructed of other materials. In some embodiments, different components of the seal carrier ring 104 may be constructed of different materials. For example, the sealing flange 126 may be constructed of a different material(s) than the bearing flange 124 and/or the web portion 128.

One or more seals or seal rings 106 may be arranged on the seal carrier ring 104. The seals 106 may be configured to prevent fluid leakage between the hubs 102 and the seal carrier ring 104. For example, one or more seals 106 may be arranged around the outer wall 134 of the sealing flange 126. In this way, the outer wall 134 of the sealing flange 126 may provide a sealing surface on which a seal may be formed with each hub 102. In some embodiments, two seals 106 may be arranged around the sealing flange 126, with one seal on each side of the web portion 128. However, in other embodiments, any other suitable numbers of seals 106 or seal rings may be used. The seal rings 106 may be configured to extend between the outer wall 134 of the sealing flange 126 and a wall or surface, such as an inner wall 114, of the hubs 102. Each seal 106 may be constructed of one or more rubbers, other rubberized materials, and/or other plastics.

The clamp 108 may be arranged over the seal carrier ring 104 so as to secure the carrier ring, seals 106, and hubs 102 in relatively fixed position with respect to one another, while still allowing rotation or swiveling of the hubs. In some embodiments, the clamp 108 may have a generally cylindrical shape configured to wrap around the bearing flange 124 of the seal carrier ring 104 and/or around the hub shoulders 122. In general, the clamp 108 may have an inner profile shape and size configured to engage tightly or snugly around or over the connection between the two hubs 102. For example and with reference to FIG. 5, the clamp 108 may have a generally C-shaped inner profile defined by an inner wall 142 extending between two sidewalls 142. The C-shaped profile may be configured to extend over the bearing flange 124 and the outer shoulders 122 of the hubs 102. In particular, the inner wall 142 may have a width equal, or approximately equal, to the width of the bearing flange 124. The inner wall 142 may be configured to abut the bearing flange 124. Each sidewall 144 may be configured to extend around or abut an outer shoulder 122 of a hub 102.

It is to be appreciated that the inner profile shape of the clamp 108 may depend, at least in part, on the size and shape of the hub shoulders 122. For example, where the shoulders 122 are squared shoulders as described above and shown in FIG. 5, the sidewalls 144 of the clamp 108 may be arranged at an angle of 90 degrees or approximately 90 degrees from the inner wall 142. In some embodiments, one or more seals 154, such as one or more wiper seals, may be arranged between the clamp 108 and each of the hubs 102.

Figure 7:
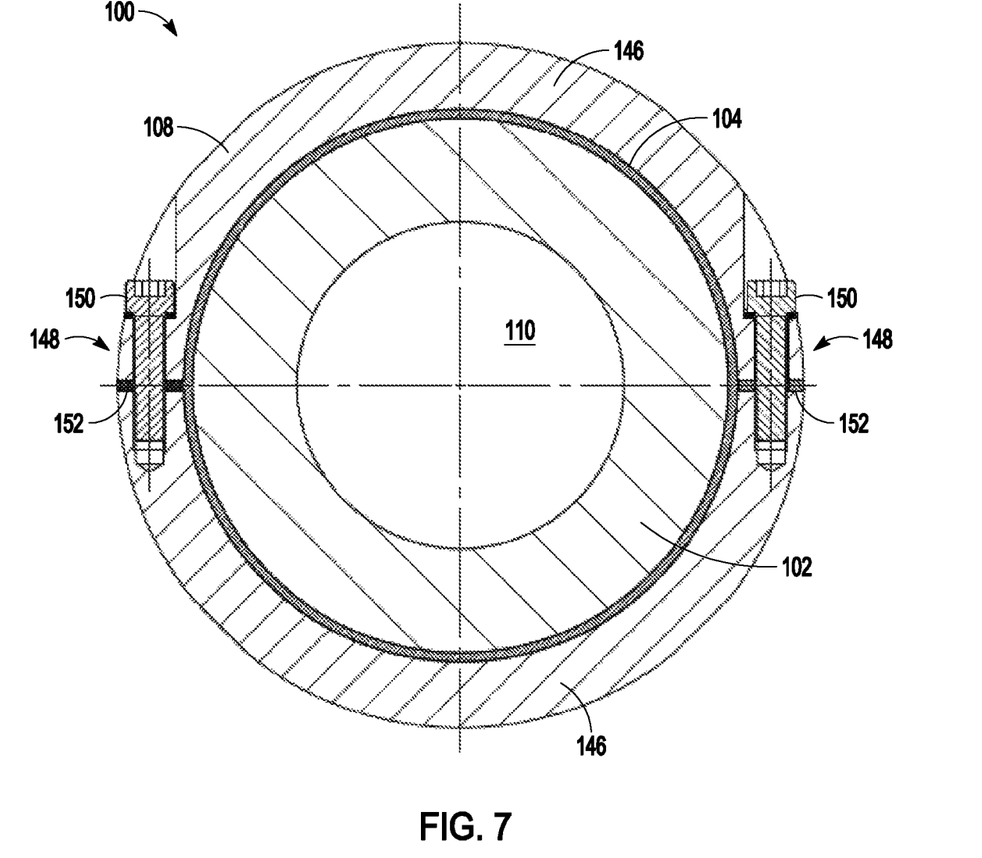
FIG. 7 is another cross-sectional view of the articulating flow line connector of FIG. 3 along line A-A, according to one or more embodiments.

In some embodiments, the clamp 108 may include two or more separable portions. For example, as shown in FIG. 7, the clamp 108 may include two semi-circular halves 146 each configured to extend around half or approximately half of the sear carrier ring 104. The two portions 146 may be coupled together at two joints 148. The two portions 146 may be coupled together using screws 150, bolts, pins, or other suitable coupling devices arranged at each joint 148. In some embodiments, the two portions 146 may be coupled together with a hinge at one joint 148. In some embodiments, a seal 152, such as weather seal, may be arranged at each joint 148 between the two halves 146. In other embodiments, the clamp 108 may be separable into any other suitable number of portions.

In use, an articulating connector 100 of the present disclosure may provide for a sealed connection between two flow line sections, while allowing for movement or rotation of the two sections with respect to one another. In particular, a seal carrier ring 104 of the present disclosure may operate to provide both a bearing surface and a sealing surface for a joint between two flow line hubs 102. The seal carrier ring 104 may operate to position the seals 106 to prevent or mitigate fluid leakage and/or pressure loss at the connection. Additionally, one or both of the hubs 102 may be configured to swivel at the connection. In particular, in use, the inner wall 132 of the bearing flange 124 may provide a first bearing surface for each of the hubs 102. Additionally, the sidewalls 138 of the web portion 128 may provide a second bearing surface for each of the hubs 102. In this way, each hub 102 may be configured to rotate or swivel by moving adjacent the first and second bearing surfaces provided by the seal carrier ring 104. This may allow operators to modify positioning of a flow line, for example. In some embodiments, an articulating connector 100 of the present disclosure may exhibit reduced movability under pressure. That is, radial forces on the connector 100 from pressurized fluid moving through the line may cause the hubs 102 to generally lock or to resist rotation or swiveling. However, the squared shoulders 122, as described above, may allow the hubs 102 to maintain some maneuverability while under pressure. Moreover, the second bearing surface provided by the sidewalls 138 of the web portion 128 may help facilitate rotation under pressure by providing a bearing surface generally aligned with the radial forces exerted on the hub 102 by pressurized fluid.

In some embodiments, radial pressure from pressurized fluid passing through the flow line may cause expansion and/or movement of the hubs 102, the seal carrier ring 104, and/or portions thereof. In conventional connectors, such expansion or movement may tend to compromise a seal and may ultimately allow fluid leakage. However, in some embodiments of the present disclosure, the articulating connector 100 may be configured with tolerances to accommodate such movement or expansion without damaging or compromising the sealed connection. In particular, the hubs 102, seal carrier ring 104, and clamp 108 may be sized and arranged to provide a larger or wider tolerance(s) surrounding the sealing flange 126 than those surrounding the bearing flange 124. For example, the components may be arranged to provide a relatively larger gap between the sealing flange 126 and an inner wall of a hub 114, and a relatively smaller gap between the outer wall 116 of the hub 102 and the clamp 108. In this way, as radial forces are exerted at the articulating connector 100, the larger or wider tolerances surrounding the sealing flange 126 may help to protect the seals 106 from being crushed and/or may help prevent the sealing surface from being scratched or otherwise damaged.

Figure 10:
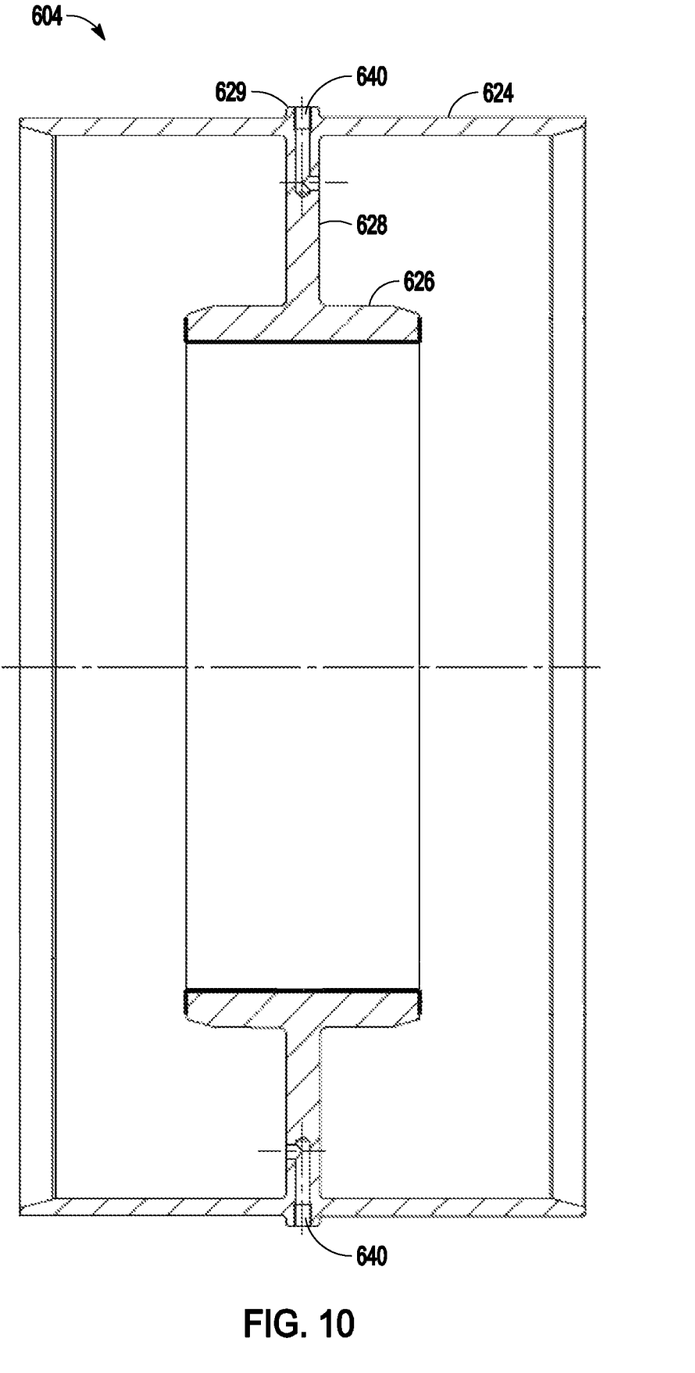
FIG. 10 is a cross-sectional view of a seal carrier and a portion of two hubs of the present disclosure, according to one or more embodiments.
Figure 11:
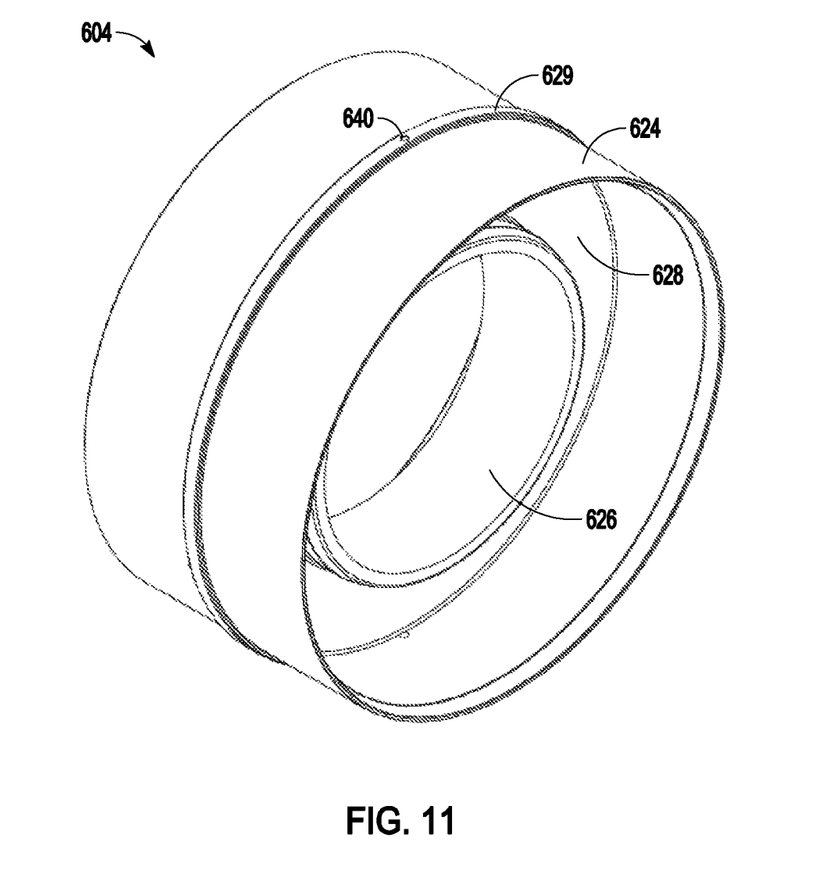
FIG. 11 is a perspective view of the seal carrier of FIG. 10, according to one or more embodiments.

FIGS. 10 and 11 show another embodiment of a seal carrier ring 604 of the present disclosure. The seal carrier ring 604 may be similar to those described above. As shown, the seal carrier ring 604 may have a bearing flange 624, a sealing flange 626, and a web portion 628 extending between the two flanges. In some embodiments, however, the seal carrier 604 may additionally have a raised band 629 extending from an outer surface of the bearing flange 624. The band 629 may have a thickness extending laterally from the bearing flange 624, and may have a width perpendicular to the thickness. The width of the band 629 may be similar to that of the web 628. In some embodiments, the band 629 may extend around a full circumference of the seal carrier 604. Moreover, in some embodiments, one or more bleed openings or holes 640 may extend through the band 629, through the bearing flange 624, and into the web portion 628. As shown in FIG. 10, each bleed hold 640 may include a 90-degree turn, and thus may be directed toward one side of the web portion 628. Each bleed hole 640 may allow air or fluid to flow from one or both sides of the web portion 628, through the hole. As described above, bleed holes 640 may help mitigate hydraulic lock as the seal carrier ring 604 is fitted over flow line sections or hubs.

It is to be appreciated that an articulating connectors and seal carrier rings of the present disclosure present improvements over conventional connectors by providing a sealing surface and a bearing surface with a single component. That is, both the sealing surface and bearing surface(s) of the articulating connector are provided by the seal carrier ring. Whereas conventional connectors may provide sealing and bearing functions using separate components, the use of a single seal carrier ring to provide both bearing and sealing functions reduces manufacturing demands and/or assembly time.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. An articulating flow line connector for connecting two flow line sections, the connector comprising:
   a pair of flow line hubs, each hub configured for coupling to an end of a flow line section;
   a seal carrier ring arranged between the flow line hubs, the seal carrier ring having a generally I-shaped cross-sectional shape with a sealing flange arranged at an inner diameter of the pair of flow line hubs and providing a sealing surface arranged adjacent to and spaced apart from an opposing sealing surface on the pair of flow line hubs, a bearing flange arranged at an outermost diameter of the pair of flow line hubs and providing a bearing surface, and a web portion extending between the sealing flange and the bearing flange;
   a seal arranged between the sealing surface and the opposing sealing surface; and
   a clamp arranged over the seal carrier ring;
   wherein each hub is rotatable about a longitudinal axis.

2. The connector of claim 1, wherein the web portion provides a second bearing surface for each hub.

3. The connector of claim 1, wherein the sealing surface is a radially outward facing surface and the seal comprises two seals arranged on each side of the web portion.

4. The connector of claim 1, wherein the bearing flange is arranged between an outer wall of each hub and an inner wall of the clamp.

5. The connector of claim 4, wherein the sealing flange is arranged between an inner wall of each hub and a cavity defined by the inner walls.

6. The connector of claim 5, wherein a tolerance between the inner wall of the hub and the sealing flange is larger than a tolerance between the outer wall of the hub and the clamp.

7. The connector of claim 1, wherein each hub has an outer wall defining an outer shoulder, and wherein the clamp is arranged around the outer shoulders of the hubs.

8. The connector of claim 1, wherein the seal carrier ring is composed of tungsten carbide.

9. The connector of claim 1, wherein the seal carrier ring is composed of metal and the seal is composed of a rubberized material.

10. The connector of claim 1, wherein the sealing flange has a first width measured in a longitudinal direction parallel to the flow line section and the bearing flange has a second width measured in the longitudinal direction that is wider than the first width.

11. An articulating flow line connector for connecting two flow line sections, the connector comprising:
   a seal carrier ring configured for arranging between two flow line hubs, the seal carrier ring having a generally I-shaped cross-sectional shape with a sealing flange arranged at an inner diameter of the pair of flow line hubs and providing a sealing surface arranged adjacent to and spaced apart from an opposing sealing surface on the pair of flow line hubs, a bearing flange arranged at an outermost diameter of the pair of flow line hubs and providing a bearing surface, and a web portion extending between the sealing flange and the bearing flange;
   a seal arranged between the sealing surface and the opposing sealing surface; and
   a clamp arranged over the seal carrier ring.

12. The connector of claim 11, wherein the web portion provides a second bearing surface for each hub.

13. The connector of claim 11, wherein the sealing surface is a radially outward facing surface and the seal comprises two seals arranged on each side of the web portion.

14. The connector of claim 11, wherein the seal carrier ring comprises, for each hub, at least one bleed hole.

15. The connector of claim 11, wherein the clamp comprises two separable portions.

16. The connector of claim 15, further comprising at least one seal arranged between the two separable portions.

17. The connector of claim 11, wherein the seal carrier ring is composed of tungsten carbide.

18. The connector of claim 11, wherein the seal carrier ring is composed of metal and the seal is composed of a rubberized material.

19. The connector of claim 11, wherein the sealing flange has a first width measured in a longitudinal direction parallel to the two flow line sections and the bearing flange has a second width measured in the longitudinal direction that is wider than the first width.

* * * * *

UNITED STATES PATENT AND TRADEMARK OFFICE
CERTIFICATE OF CORRECTION

| | | |
|---|---|---|
| PATENT NO. | : 11,506,314 B2 | Page 1 of 1 |
| APPLICATION NO. | : 16/214930 | |
| DATED | : November 22, 2022 | |
| INVENTOR(S) | : Westgarth et al. | |

It is certified that error appears in the above-identified patent and that said Letters Patent is hereby corrected as shown below:

On the Title Page

On page 2, in Column 1, under Item (56) "U.S. Patent Documents", Line 46, delete "2021/0035491" and insert --2021/0354910-- therefor On page 2, in Column 2, under Item (56) "Other Publications", Line 20, delete ""international" and insert --"International-- therefor Signed and Sealed this
Twenty-ninth Day of August, 2023

Katherine Kelly Vidal
*Director of the United States Patent and Trademark Office*